United States Patent
Brown et al.

(10) Patent No.: US 6,400,805 B1
(45) Date of Patent: *Jun. 4, 2002

(54) STATISTICAL DATABASE CORRECTION OF ALPHANUMERIC IDENTIFIERS FOR SPEECH RECOGNITION AND TOUCH-TONE RECOGNITION

(75) Inventors: Deborah W. Brown, Manalapan; Randy G. Goldberg, Princeton; Stephen Michael Marcus, Morristown; Richard R. Rosinski, Middletown; Benjamin J. Stern, Morristown Township, Morris County, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/097,769

(22) Filed: Jun. 15, 1998

(51) Int. Cl.[7] ................................................. H04M 1/64
(52) U.S. Cl. ................... 379/88.01; 704/251; 704/270; 704/275
(58) Field of Search ........................... 379/88.01–88.04; 704/236–240, 243, 251, 252, 270, 275; 382/159–161, 181, 185, 209; 455/563

(56) References Cited

U.S. PATENT DOCUMENTS

| | | |
|---|---|---|
| 3,466,394 A | 9/1969 | French |
| 3,752,904 A | 8/1973 | Waterbury |
| 3,896,266 A | 7/1975 | Waterbury |
| 3,988,715 A | 10/1976 | Mullan et al. |
| 4,718,102 A | 1/1988 | Crane et al. |
| 4,783,804 A | 11/1988 | Juang et al. |
| 4,817,156 A | 3/1989 | Bahl et al. |
| 4,819,271 A | 4/1989 | Bahl et al. |

(List continued on next page.)

FOREIGN PATENT DOCUMENTS

| | | |
|---|---|---|
| EP | 0 319 193 A2 | 6/1989 |
| WO | WO 96 10795 | 4/1996 |
| WO | 96 36042 | 11/1996 |

OTHER PUBLICATIONS

L.G. Kersta; "Voiceprint Identification"; Bell Telephone Laboratories, Inc., Murray Hill, NJ; Nature; Dec. 29, 1962; pp. 1253–1257.

Joseph P. Campbell, Jr.; "Speaker Recognition: A Tutorial"; Proceedings of the IEEE, Vol. 85, No. 9, Sep., 1997; pp. 1437–1462.

Vernooij et al., A Simulation Sudy of the Usefulness of Broad Phonetic Classification in Automatic Speech Recognition, May 1989, Acoustics, Speech, and Signal Processing, Internation Conference ICASSP–89, vol. 1, pp. 85–88.*

*Primary Examiner*—Fan Tsang
*Assistant Examiner*—Roland G. Foster
(74) *Attorney, Agent, or Firm*—Kenyon & Kenyon

(57) ABSTRACT

A method and apparatus recognize an identifier entered by a user. A caller enters a predetermined identifier through a voice input device or a touch-tone keypad of a telephone handset. A signal representing the entered identifier is transmitted to a remote recognizer, which responds to the identifier signal by producing a recognized output intended to match the entered identifier. The present invention compares this recognized identifier with a list of valid reference identifiers to determine which one of these reference identifiers most likely matches the entered identifier. In performing this determination, the present invention compares each character of the recognized identifier with a character in a corresponding character position of each reference identifier in light of a plurality of confusion sets. On the basis of this comparison, the set of reference identifiers is reduced to a candidate set of reference identifiers, from which a reference identifier that matches the input identifier provided by the user.

28 Claims, 6 Drawing Sheets

U.S. PATENT DOCUMENTS

| | | | |
|---|---|---|---|
| 4,908,865 A | 3/1990 | Doddington et al. | |
| 5,023,912 A | 6/1991 | Segawa | |
| 5,027,406 A | 6/1991 | Roberts et al. | |
| 5,034,989 A | 7/1991 | Loh | |
| 5,050,215 A | 9/1991 | Nishimura | |
| 5,101,345 A | 3/1992 | MacPhail | |
| 5,125,022 A | 6/1992 | Hunt et al. | |
| 5,127,043 A | 6/1992 | Hunt et al. | |
| 5,167,016 A | 11/1992 | Bagley et al. | |
| 5,179,718 A | 1/1993 | MacPhail | |
| 5,216,720 A | 6/1993 | Naik et al. | |
| 5,255,310 A | 10/1993 | Kim et al. | |
| 5,274,560 A | 12/1993 | LaRue | |
| 5,283,833 A | 2/1994 | Church et al. | |
| 5,297,194 A | 3/1994 | Hunt et al. | |
| 5,303,299 A | 4/1994 | Hunt et al. | |
| 5,365,574 A | 11/1994 | Hunt et al. | |
| 5,384,833 A | 1/1995 | Cameron | |
| 5,418,717 A | 5/1995 | Su et al. | |
| 5,452,397 A | 9/1995 | Ittycheriah et al. | |
| 5,454,062 A | 9/1995 | LaRue | |
| 5,455,889 A | 10/1995 | Bahl et al. | |
| 5,465,290 A | 11/1995 | Hampton et al. | |
| 5,497,319 A | 3/1996 | Chong et al. | |
| 5,499,288 A | 3/1996 | Hunt et al. | |
| 5,502,774 A | 3/1996 | Bellegarda et al. | |
| 5,504,805 A | 4/1996 | Lee | |
| 5,509,104 A | 4/1996 | Lee et al. | |
| 5,517,558 A | 5/1996 | Schalk | |
| 5,519,786 A | 5/1996 | Courtney et al. | |
| 5,526,465 A | 6/1996 | Carey et al. | |
| 5,535,120 A | 7/1996 | Chong et al. | |
| 5,566,272 A | 10/1996 | Brems et al. | |
| 5,577,164 A | 11/1996 | Kaneko et al. | |
| 5,613,109 A | 3/1997 | Yamauchi et al. | |
| 5,623,578 A | 4/1997 | Mikkilineni | |
| 5,623,609 A | 4/1997 | Kaye et al. | |
| 5,640,490 A | 6/1997 | Hansen et al. | |
| 5,642,519 A | 6/1997 | Martin | |
| 5,655,058 A | 8/1997 | Balasubramanian et al. | |
| 5,675,647 A | 10/1997 | Garneau et al. | |
| 5,675,704 A | 10/1997 | Juang et al. | |
| 5,675,706 A * | 10/1997 | Lee et al. | 704/256 |
| 5,677,989 A | 10/1997 | Rabin et al. | |
| 5,677,990 A | 10/1997 | Junqua | |
| 5,680,509 A | 10/1997 | Gopalakrishnan et al. | |
| 5,680,511 A | 10/1997 | Baker et al. | |
| 5,687,287 A | 11/1997 | Gandhi et al. | |
| 5,729,656 A | 3/1998 | Nahamoo et al. | |
| 5,745,555 A | 4/1998 | Mark | |
| 5,748,840 A | 5/1998 | La Rue | |
| 5,754,695 A | 5/1998 | Kuo et al. | |
| 5,764,799 A | 6/1998 | Hong et al. | |
| 5,769,527 A | 6/1998 | Taylor et al. | |
| 5,781,882 A | 7/1998 | Davis et al. | |
| 5,794,042 A | 8/1998 | Terada et al. | |
| 5,797,123 A | 8/1998 | Chou et al. | |
| 5,799,269 A | 8/1998 | Schabes et al. | |
| 5,802,205 A | 9/1998 | Emico et al. | |
| 5,806,040 A | 9/1998 | Vensko | |
| 5,818,952 A | 10/1998 | Takenouchi et al. | |
| 5,829,000 A | 10/1998 | Huang et al. | |
| 5,832,063 A | 11/1998 | Vysotsky et al. | |
| 5,841,901 A | 11/1998 | Arai et al. | |
| 5,850,480 A | 12/1998 | Scanlon | |
| 5,870,492 A | 2/1999 | Shimizu et al. | |
| 5,875,108 A | 2/1999 | Hoffberg et al. | |
| 5,889,897 A | 3/1999 | Medina | |
| 5,903,864 A | 5/1999 | Gadbois et al. | |
| 5,913,196 A | 6/1999 | Talmor et al. | |
| 5,937,385 A | 8/1999 | Zadrozny et al. | |
| 5,963,666 A * | 10/1999 | Fujisaki et al. | 382/187 |
| 6,061,654 A * | 5/2000 | Brown et al. | 704/275 |
| 6,122,612 A * | 9/2000 | Goldberg | 704/231 |
| 6,137,863 A * | 10/2000 | Brown et al. | 379/88.01 |
| 6,141,661 A * | 10/2000 | Brown et al. | 707/104 |
| 6,154,579 A * | 11/2000 | Goldberg | 382/310 |
| 6,205,261 B1 * | 3/2001 | Goldberg | 382/310 |
| 6,205,428 B1 * | 3/2001 | Brown et al. | 704/270 |

\* cited by examiner

FIG. 2

RECOGNIZED

| | A | B | C | D | E | F | G | H | I | J | 0 | 1 | 2 | 3 | 4 | 5 | 6 | 7 | 8 | 9 |
|---|---|---|---|---|---|---|---|---|---|---|---|---|---|---|---|---|---|---|---|---|
| A | .50 | | | | | | | | | | | | | | | | | | | |
| B | | .70 | .05 | .20 | .20 | | | | | | | | | | | | | | | |
| C | | | .90 | | | | | | | | | | | | | | | | | |
| D | | .20 | .05 | | | | | | | | | | | | | | | | | |
| E | | .05 | | | | | | | | | | | | | | | | | | |
| F | | | | | | | | | | | | | | | | | | | | |
| G | | | | | | | | | | | | | | | | | | | | |
| H | | | | | | | | | | | | | | | | | | | | |
| I | | | | | | | | | | | | | | | | | | | | |
| J | .30 | | | | | | | | | | | | | | | | | | | |
| 0 | | | | | | | | | | | .90 | | | | | | | | | |
| 1 | | | | | | | | | | | | .90 | | | | | | | | |
| 2 | | | | | | | | | | | | | .90 | | | | | | | |
| 3 | | .05 | | .20 | .20 | | | | | | | | | .90 | | | | | | |
| 4 | | | | | | | | | | | | | | | .90 | | | | | |
| 5 | | | | | | | | | | | | | | | | .90 | | | | |
| 6 | | | | | | | | | | | | | | | | | .90 | | | |
| 7 | | | | | | | | | | | | | | | | | | .90 | | |
| 8 | .20 | | | | | | | | | | | | | | | | | | .90 | |
| 9 | | | | | | | | | | | | | | | | | | | | .90 |

SPOKEN

FIG. 4

CONFUSION SET 1: AJK
CONFUSION SET 2: EBCDPTV
CONFUSION SET 3: SFX
CONFUSION SET 4: IROL
CONFUSION SET 5: MN
CONFUSION SET 6: W
CONFUSION SET 7: H

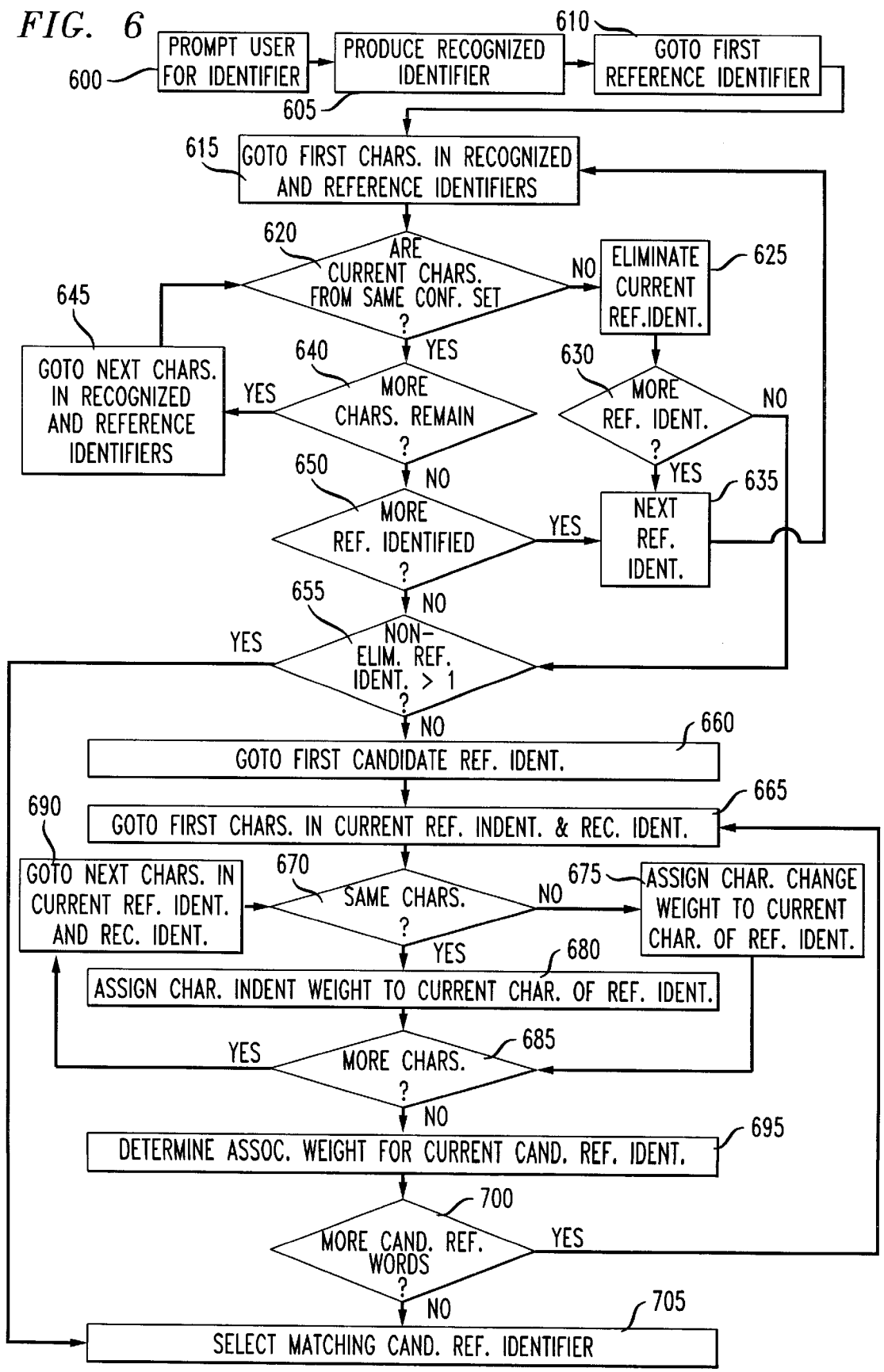

STATISTICAL DATABASE CORRECTION OF ALPHANUMERIC IDENTIFIERS FOR SPEECH RECOGNITION AND TOUCH-TONE RECOGNITION

CROSS-REFERENCE TO RELATED APPLICATIONS

The present application is related to the following applications: U.S. patent application No. 08/763,382, filed Dec. 13, 1996, entitled "STATISTICAL DATABASE CORRECTION OF ALPHANUMERIC ACCOUNT NUMBERS FOR SPEECH RECOGNITION AND TOUCH-TONE RECOGNITION"; U.S. patent application No. 08/771,356, filed Dec. 16, 1996, now U.S. Pat. No. 6,061,654 issued May 9, 2000, entitled "CONSTRAINED ALPHA-NUMERICS FOR ACCURATE ACCOUNT NUMBER RECOGNITION"; U.S. patent application No. 08/909,199, filed Aug. 11, 1997, entitled "A CONFUSION MATRIX BASED METHOD AND SYSTEM FOR CORRECTING MISRECOGNIZED WORDS APPEARING IN DOCUMENTS GENERATED BY AN OPTICAL CHARACTER RECOGNITION TECHNIQUE"; U.S. patent application No. 08/909,200, filed Aug. 11, 1997, entitled "METHOD AND APPARATUS FOR PERFORMING AN AUTOMATIC CORRECTION OF MISRECOGNIZED WORDS PRODUCED BY AN OPTICAL CHARACTER RECOGNITION TECHNIQUE BY USING A HIDDEN MARKOV MODEL BASED ALGORITHM"; U.S. patent application No. 08/953,579, filed Oct. 17, 1997, entitled "METHOD AND APPARATUS FOR ACCESSING PREDEFINED GRAMMARS"; U.S. patent application No. 08/953,469, filed Oct. 17, 1997, entitled "METHOD AND APPARATUS FOR MINIMIZING GRAMMAR COMPLEXITY"; U.S. patent application No. 08/953,468, filed Oct. 17, 1997, entitled "METHOD AND APPARATUS FOR PERFORMING A GRAMMAR-PRUNING OPERATION"; U.S. patent application No. 08/975,587, filed Nov. 20, 1997, entitled "METHOD AND APPARATUS FOR PERFORMING A NAME ACQUISITION BASED ON SPEECH RECOGNITION"; U.S. patent application No. 08/975,588, filed Nov. 20, 1997, entitled "CONFUSION SET-BASED METHOD AND APPARATUS FOR PRUNING A PREDETERMINED ARRANGEMENT OF INDEXED IDENTIFIERS"; U.S. patent application No. 08/975,589, filed Nov. 20, 1997, entitled "CHECK-SUM BASED METHOD AND APPARATUS FOR PERFORMING SPEECH RECOGNITION"; U.S. patent application No. 08/928,678, filed Dec. 2, 1997, now U.S. Pat. No 5,980,152 issued Nov. 9, 1999, entitled "METHOD AND APPARATUS FOR ACCESSING A SYSTEM ON THE BASIS OF PLURAL MATCHING OPERATIONS"; and U.S. patent application No. 09/018,449, entitled "STATISTICAL OPTION GENERATOR FOR ALPHA-NUMERIC PRE-DATABASE SPEECH RECOGNITION CORRECTION"; and U.S. patent application Ser. No. 09/018,575, filed Feb. 5, 1998, entitled "A CONFUSION SET BASED METHOD AND SYSTEM FOR CORRECTING MISRECOGNIZED WORDS APPEARING IN DOCUMENTS GENERATED BY AN OPTICAL CHARACTER RECOGNITION TECHNIQUE".

BACKGROUND OF THE INVENTION

The present invention relates to a method and apparatus for recognizing an identifier that is entered into a system by a user, and in particular, to a method and apparatus that finds a match for such an input identifier from among a plurality of reference identifiers on the basis of a plurality of confusion sets.

Most institutions, such as banks and department stores, allow customers to access over the telephone a wide variety of services and account information. Before the advent of touch-tone telephones, a customer would obtain these services and information through interacting with a live operator. As touch-tone telephones became more prevalent in homes, these institutions began switching to automated customer-access systems. After dialing a telephone number, a customer using such systems would be asked to enter an account number or identifier. As used herein, the terms "account number" and "identifier" are used interchangeably, and they refer to a string of characters that may comprise a plurality of letters, numbers, or both. Furthermore, as used herein, an identifier may be used not only to identify a user, but also may be used as an identifier for identifying a particular product or service offered by an institution. In the first generation of automated customer-access systems, a user would enter such an identifier by sequentially pressing a series of keys provided on the telephone keypad. Each pressed key would correspond to a different character in the identifier. The pressing of these keys would produce a series of tones that would be provided over a telephone network to the institution. At the institution, the series of tones would be decoded to produce the entered identifier, and if the identifier entered by the user was determined to correspond to a valid identifier, then the user would be allowed to enter commands, again through the telephone keypad, that would provide access to whatever services would be offered by the institution.

The next generation of automated customer-access systems eliminates the use of telephone keypads to verify the identity of a valid user. Had of entering an identifier through a telephone keypad, a user would be prompted to speak the identifier into the telephone handset. For example, the user may speak into the telephone the identifier "JB123E". The user's voice signal would be transmitted over the phone lines to the financial institution, which would employ a speech recognition system to produce a recognized identifier that is intended to correspond exactly to the identifier spoken by the user.

Nevertheless, such exact correspondence is quite difficult to attain, mostly due to the deterioration of voice signals that routinely occurs over conventional telephone lines. In particular, as a voice signal is transmitted to a remote location, conventional telephone lines introduce into such signals noise and restrictive band limitations. Such a deterioration present in a voice signal may cause a remote speech recognizer to produce a recognized output that does not correspond to the spoken identifier. Because of the limitations introduced into the voice signal by the telephone lines, the speech recognizer may confuse similar sounding letters and numbers. Thus, a speech recognizer may confuse the letter "A" with the number "8", the letter "K", or the letter "J". Similarly, the speech recognizer may confuse the letter "C" with the letter "D" or the number "3". For example, given that a user speaks the identifier "JB123E" into a telephone, the speech recognizer may produce "AE123D" as an output. Accordingly, a need exists to enhance the accuracy of such speech recognition systems and overcome the limitations introduced into voice signals by typical communication lines, such as, for example, conventional telephone lines.

Similarly, touch-tone recognition systems also mistakenly recognize the wrong identifier. Accordingly, a need also exists to enhance the accuracy of such touch-tone recognition systems.

SUMMARY OF THE INVENTION

In order to overcome these deficiencies, the present invention is directed to a method and apparatus that enhances the reliability of a system intended to recognize multi-character identifiers provided by a remote user.

In a first representative embodiment of the present invention, the remote user enters an identifier by speaking into a voice input device. The present invention then provides a recognized identifier based on the entered identifier, the recognized identifier comprising a second plurality of predetermined characters. The present invention stores a plurality of reference identifiers, each one of the plurality of reference identifiers comprising a different plurality of predetermined characters. The present invention selects a match for the input identifier from this plurality of reference identifiers. The present invention also provides a plurality of confusion sets, each confusion set grouping together a different plurality of character members. The present invention compares each character in the recognized identifier with a character in a corresponding character position of each reference identifier to determine which characters in the recognized identifier do not correspond to characters in corresponding character positions of the reference identifiers. If a character in the recognized identifier does not match the character in the corresponding character position of a recognized identifier, the present invention eliminates the reference identifier if the non-matching characters are not from the same confusion set. After performing this comparison for every reference identifier, the present invention determines how many non-eliminated reference identifiers remain. If more than one such reference identifiers remain, the present invention will prompt the user with each remaining reference identifier until the user provides a positive confirmation that a particular reference identifier matches the input identifier. Alternatively, the present invention assigns an associative weighting to each remaining reference identifier and selects the reference identifier with the highest associative weighting as matching the input identifier. If only one reference identifier remains after the elimination operation, then that sole remaining reference identifier is selected as matching the input identifier.

According to yet another representative embodiment, the present invention is implemented in a touch tone recognition system. In this embodiment, a user enters an identifier through a conventional keypad of a touch-tone telephone. The system includes any suitable touch-tone recognizer for producing a recognized identifier, and the present invention selects a matching reference identifier for the input identifier entered in this manner according to the same operation discussed above.

BRIEF DESCRIPTION OF THE DRAWINGS

Other features and advantages of the present invention will become apparent from the following detailed description, together with the drawings, in which:

FIG. 2 shows a confusion matrix for arranging a plurality of probabilities indicative of the likelihood that a particular character in a reference identifier was spoken by a user;

FIG. 4 shows an exemplary group of confusion sets;

FIG. 6 shows a flow diagram outlining the operation of the present invention according to a second embodiment.

DETAILED DESCRIPTION

Figure 1:
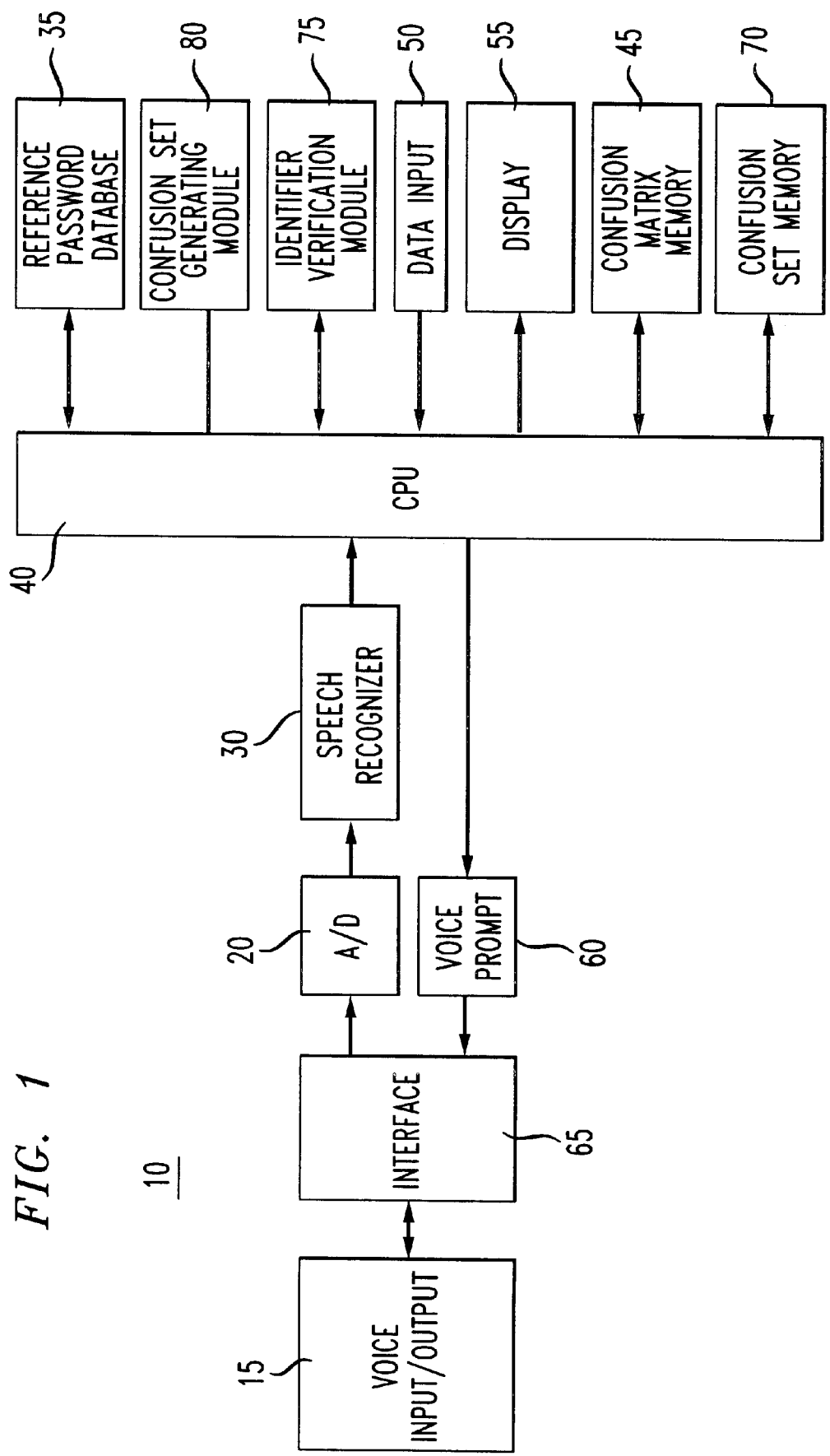
FIG. 1 shows a block diagram of a speech recognition system in accordance with the present invention.

FIG. 1 illustrates a system that implements a speech recognition routine in accordance with the present invention.

The system of FIG. 1 is merely an example of one kind of system that is capable of supporting the present speech recognition routine, and it should be appreciated that the present speech recognition routine is compatible with numerous other applications.

The system 10 of FIG. 1 includes a voice input/output device 15, which may comprise a conventional telephone or microphone. A user wishing to access a particular service provided by the system would be prompted to speak into voice input/output device 15 a predetermined identifier. For purposes of this discussion, the user shall be assumed to speak a valid identifier into device 15. This voice signal can be carried over a telephone line to a public telephone network interface 65, which interfaces the voice signal generated by voice input/output device 15 to the remaining components of the speech recognition system. Of course, any wired or wireless connection could convey the voice signal to the speech recognition system. The system of FIG. 1 further includes an A/D converter 20, which converts the analog voice signal provided by interface 65 into a digital signal. A/D converter 20 supplies the digitized voice signal to speech recognizer 30, which may comprise, for example, a HARK 3.0 recognizer, which is manufactured by BBN Co. After employing a recognition routine, for example, the Hidden Markov Model, speech recognizer 30 provides as an output a recognized identifier, which may or may not correspond to the identifier that the user spoke into the telephone. The recognized output is provided to an input of CPU 40. CPU 40 is configured to determine whether the recognized identifier corresponds to any one of a plurality of valid identifiers stored in reference identifier database 35, which may comprise a hard disk or any other suitable storage medium capable of storing a large number of account numbers.

As explained before, the system 10 may be constructed to accommodate touch-tone recognition. In this system, any suitable touch-tone recognizer would be used in place of the speech recognizer. A user would then enter an input identifier through the keys of a touch-tone keypad provided by device 15. The remaining operation of such a touch-tone based system would follow the operation of the speech recognition system to be described hereafter.

Returning to FIG. 1, the identifier recognition routine that CPU 40 uses to verify the validity of a recognized identifier is stored in identifier verification module 75. Used in conjunction with the routine of module 75 is a plurality of confusion sets stored in confusion set memory 70. The confusion sets are generated on the basis of one or more confusion matrices maintained in confusion matrix memory 45 in accordance with the instructions provided in confusion set generating module 80. CPU 40 controls a voice prompt device 60, which may comprise DIALOGIC telephone interface cards. CPU 40 causes voice prompt device 60 to issue voice inquiries to a user at voice input/output device 15. For example, the voice prompt device 60 may issue an inquiry such as "Please tell me your identifier". The system of FIG. 1 also includes a data input device 50, such as a keyboard, a CD-ROM drive, or a floppy drive, and the system of FIG. 1 is also provided with a display 55.

FIG. 2 illustrates a confusion matrix that is used by CPU 40 to produce a plurality of confusion sets. U.S. patent application Ser. No. 08/763,382, the entire disclosure of which is incorporated by reference herein, also contains a discussion of confusion matrices. For the example provided in FIG. 2, the identifier grammar shall be LLNNNE. That is, each one of the valid identifiers stored in database 35 is six characters long in which the first two character positions may comprise only letters of the alphabet, the third through fifth character positions may comprise only numerals 0–9, and the last character position may comprise either a letter or a numeral. In order to avoid confusing the letter "O" with the numeral "0", the identifier grammar may be configured to exclude the letter "O" as a possible letter to be used in the first, second, or last character positions, and recognizer 30 would be configured to recognize the numeral "0" when it is spoken by a user either as "oh" or "zero". Of course, the characters that constitute the identifier grammar can be configured to be of whatever length and may comprise any combination of letters, numerals, or both. Further, the characters that constitute the identifiers may comprise such typographical characters as "%", "#", "&", "@", etc.

Since illustrating a confusion matrix for the entire alphabet is not necessary to explain the operation of the identifier recognition routine, the confusion matrix of FIG. 2 is limited to a portion of the alphabet. Furthermore, the matrix is not provided with every entry because the following discussion shall refer to a limited number of identifiers and the entries provided in the matrix correspond to those letters that are included in this limited group of identifiers. Thus, all the blanks in FIG. 2 should be considered to be zero. Of course, when the system of the present invention is implemented, the confusion matrix would be provided with a complete set of entries and the database would be provided with a large amount of identifiers, for example, 100,000.

The confusion matrix of FIG. 2 is read as follows: the vertical columns correspond to letters and numbers that were recognized by recognizer 30, and the horizontal rows correspond to letters and numbers spoken into the telephone. Of course, the confusion matrix of FIG. 2 may be configured in reverse, in which the horizontal rows correspond to letters and numbers recognized by recognizer 30, and in which the vertical columns correspond to letters and numbers spoken into the telephone. The decimals that are provided in the confusion matrix represent different probabilities. For example, based on the confusion matrix of FIG. 2, given that "A" is recognized by recognizer 30, the probability that "A" was spoken by a user into a telephone is 50%. For the recognized letter "A", there is also a probability of 30% that "J" was spoken, and there is a probability of 20% that "8" was spoken when "A" was recognized.

The particular probabilities that are provided in FIG. 2 are determined in advance through experimentation, and they are tailored to suit the particular recognizer 30 that is used in the system of FIG. 1. Thus, when a particular recognizer is to be used in the system of FIG. 1, a test group of persons repetitively provides pronunciations of each of the letters and numerals, and the recognized output of recognizer 30 for each pronunciation is recorded. In order that the results of these tests incorporate the influence of the noise and bandwidth limitations that affect speech recognizers operating under real conditions when receiving voice signals from a telephone line, the vocal pronunciations of this test group of persons may be provided to the speech recognizer over a telephone line. From these various "trial runs" of the recognizer 30, the probabilities that characterize the recognition accuracy of the recognizer are established, and these probabilities can be entered as a confusion matrix into memory 45 through data input device 50. Since different recognizers exhibit different recognition accuracies, if recognizer 30 is to be replaced with a different recognizer, then a confusion matrix corresponding to the replacement recognizer must be entered into memory 45. Or alternatively, memory 45 may store in advance a plurality of predetermined confusion matrices corresponding to different recognizers, so that when a replacement recognizer is implemented, the corresponding confusion matrix may be selected by entering a command through input device 50. It should be noted that the probabilities of a confusion matrix need not be arranged in matrix form, but may be arranged as an array, or as any other data structure capable of associating a recognized and spoken character in terms of a probability.

Figure 3:
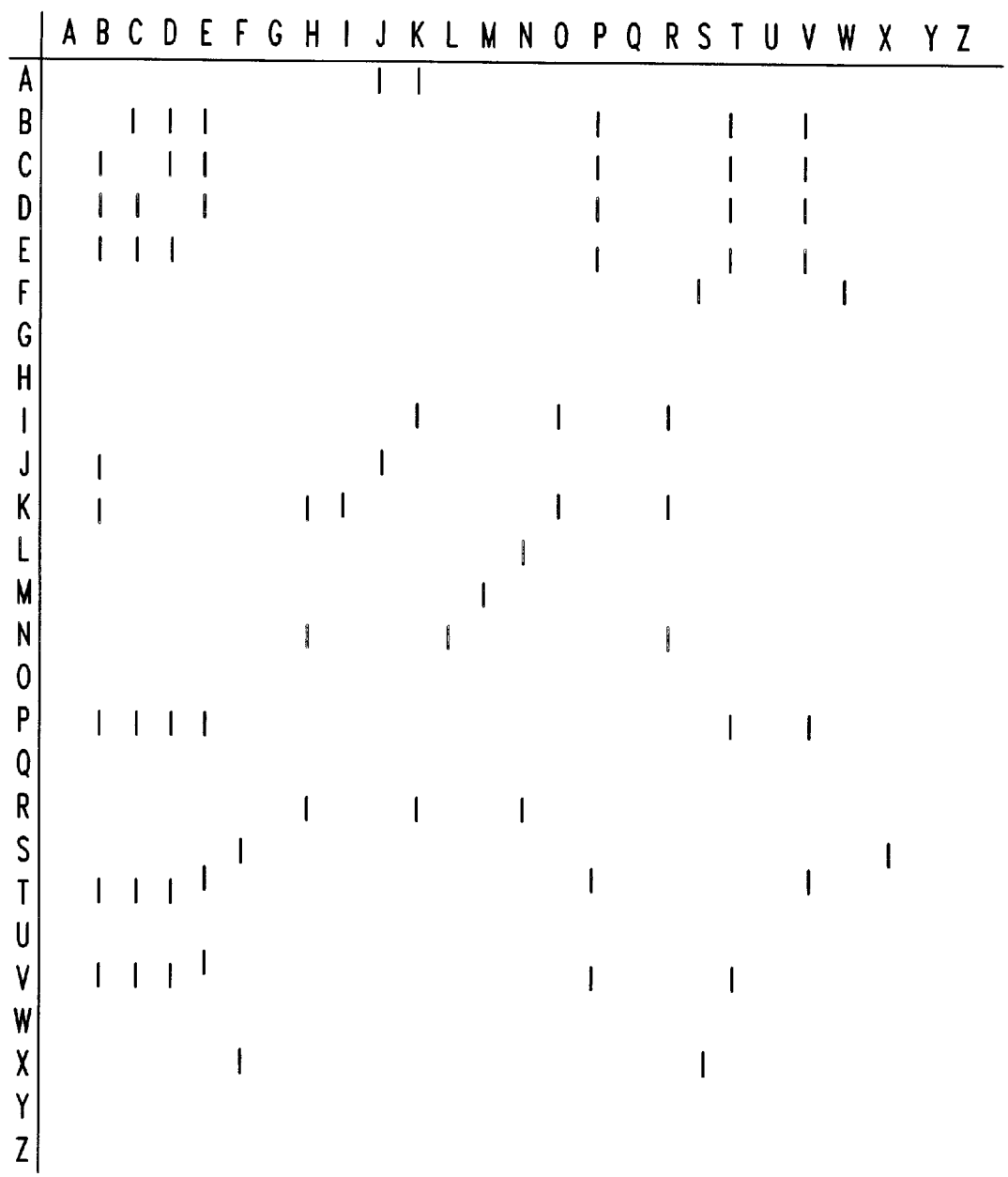
FIG. 3 shows a connectivity matrix from which a plurality of confusion sets are derived.

In order to discuss the manner in which a plurality of confusion sets are generated, reference is now made to FIGS. 3 and 4, along with U.S. patent application Ser. No. 08/975,588, which is incorporated by reference herein. FIG. 3 illustrates what is referred to as a connectivity matrix, from which a plurality of confusion sets may be obtained. An example of a plurality of confusion sets is shown in FIG. 4. Each confusion set is intended to group together those letters that are most likely to be confused with each other. Within the context of a speech recognition system, the letters that are most often confused with each other are the letters that are pronounced the most similarly. The manner in which these confusion sets are generated is such that characters from different confusion sets have a relatively low probability of being confused with each other. As shall be explained in connection with FIG. 3, the determination of which letters should be grouped together is based on the recognition probabilities arranged in the confusion matrix of memory 45. In FIG. 4, confusion set 1 groups together the letters "A", "J", and "K". Confusion set 2 groups together the letters "B", "C", "D", "E", "P", "T", and "V". Confusion set 3 comprises the letters "S", "F", and "X". Confusion set 4 comprises the letters "I", "R", "O", and "L". Confusion set 5 comprises the letters "M" and "N". Confusion set 6 comprises the letter "W", and confusion set 7 comprise the letter "H".

Operating in accordance with the instructions provided by confusion set generating module 80 and in accordance with the confusion matrix provided in memory 45, CPU 40 performs the necessary calculations and procedures for generating the confusion sets. Once generated, these confusion sets are maintained in memory 70. It should be appreciated that, for this example, the confusion matrix used to generate the confusion sets of FIG. 4 does not correspond to the exemplary confusion matrix of FIG. 2. Instead, the confusion matrix used to generate these confusion sets corresponds to one that covers the entire alphabet. Of course, the confusion set generating method to be described is applicable to all confusion matrices, regardless of the particular characters that are covered by them. The first step in generating the confusion sets involves generating a matrix based on the confusion matrix that corresponds to the speech recognizer 30 currently in use. In particular, each entry location (i.e., the intersection point of row X with column Y) of the newly generated matrix is populated with a value of 1 if the same entry location in the confusion matrix is populated with a recognition probability that is greater than a predetermined threshold. For those entry locations of the confusion matrix having recognition probabilities that are less than or equal to the threshold, the corresponding entry locations of the newly generated matrix receive a value of 0. The threshold is determined empirically according to any suitable method, and it reflects the recognition characteristics of the speech recognizer associated with the confusion matrix. The newly generated matrix that results from this procedure is a matrix that comprises only ones and zeroes. This matrix is then multiplied by itself a number of times equal to the amount of characters represented by the confusion matrix. Thus, if the confusion matrix covers the entire alphabet, which includes twenty-six letters, then the onesand-zeroes matrix is multiplied by itself twenty-six times. The product of this multiplication is referred to as a connectivity matrix, an example of which is illustrated in FIG. 3.

The distribution of characters among the various confusion sets depends on the distribution of ones in the connectivity matrix. Everywhere in the connectivity matrix that there is a "one," the letters of the associated row and column are included in the same confusion set. For example, in FIG. 3, the column corresponding to the letter "A" includes a "one" at the rows corresponding to the letters "J" and "K". Thus, the letters "A", "J", and "K" are placed within one confusion set. For column "B", "ones" are associated with rows "C", "D", "E", "P", "T", and "V". Thus, the letters "B", "C", "D", "E", "P", "T", and "V" are included in another confusion set. This process is repeated until each character represented in the original confusion matrix is associated with a confusion set. The confusion sets of FIG. 4 represent one possible arrangement that the above-discussed process may yield.

It should be appreciated that this confusion set generation need not be performed after the system is put in practice, but instead may be accomplished before the system 10 begins interacting with users. Moreover, every time a new recognizer is installed, and consequently a new associated confusion matrix is activated, the system 10 requires a corresponding new plurality of confusion sets to be generated. Of course, each different plurality of confusion sets may be generated beforehand, so that if a new speech recognizer is implemented, the appropriate plurality of confusion sets may be activated by entering a command through data input device 50. Further, the above-discussed procedure is not the only way to generate a plurality of confusion sets; the present invention is intended to encompass any suitable process for grouping the most often confused letters with one another. Thus, for example, had the system 10 been programmed to store recognition probabilities according to a data structure other than a confusion matrix, the present invention would encompass whatever technique is suitable for that data structure for determining which groups of letters are most often confused with one another. Alternatively, the composition of each confusion set may be determined empirically by having a programmer or a group of persons select which characters should be grouped together based on how close they are perceived to be in view of their respective pronunciations. Also, with respect to the character weightings assigned to each confusion set, which shall be described soon hereafter, once a new confusion matrix and associated plurality of confusion sets are activated in response to the use of a new recognizer, CPU 40 determines new character weightings for each confusion set.

Figure 5:
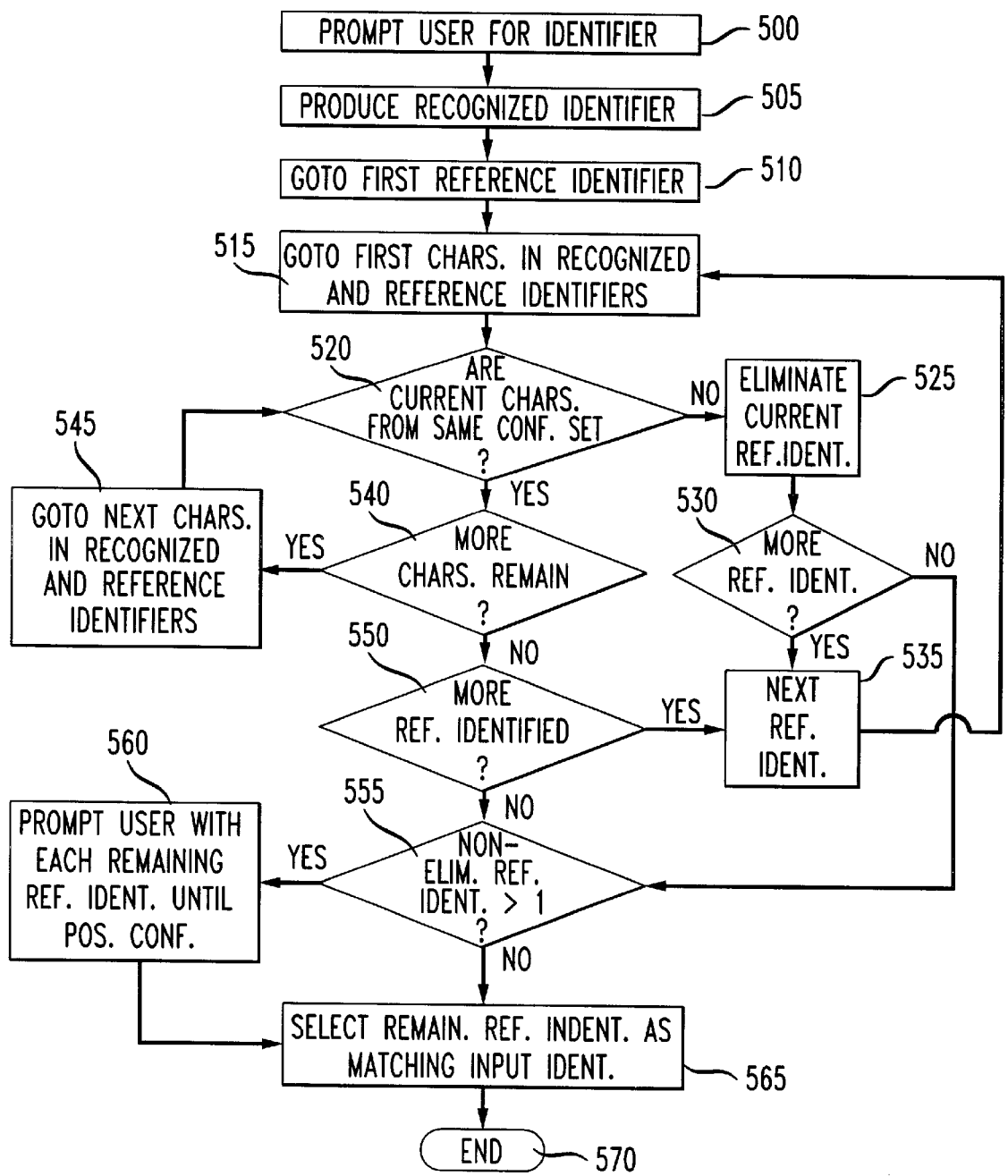
FIG. 5 shows a flow diagram outlining the operation of the present invention according to a first embodiment.

The flow charts of FIGS. 5 and 6 illustrate the operation of CPU 40 in accordance with various identifier verification routines stored in module 75. Depending on the particular implementation, CPU 40 may select among these stored routines either automatically or based on a command entered through data input device 50. With respect to FIG. 5, voice prompt device 60, under the control of CPU 40, prompts the user to speak his identifier (step 500). For illustrative purposes, the spoken identifier shall be assumed to be AEJFD and it is assumed to be valid. Of course, valid identifiers are not limited to alphabetical letters, but instead may comprise numbers or typographical characters. In order to accommodate such identifiers, the confusion matrix, along with the confusion sets derived therefrom, would of course include such numbers and typographical characters.

Returning to FIG. 5, the voice signal corresponding to this identifier is supplied through interface 65 to A/D converter 20, which generates a digitized voice signal corresponding to the spoken identifier. This digitized voice signal is supplied to recognizer 30, which represents the digitized voice signal according to a well known digital coding technique. This digital code is referred to as a recognized identifier, and it may or may not include each character of the identifier that was spoken by the user (step 505). In this example, the recognized identifier shall be assumed to be JBKFP. CPU 40 then accesses the reference identifiers from database 35 and goes to the first (step 510).

CPU 40 then goes to the first character in the current reference identifier and the recognized identifier (step 515). CPU 40 then determines whether the current characters from the reference identifier and the recognized identifier are from the same confusion set (step 520). If they are not from the same confusion set, CPU 40 eliminates the current reference identifier from further consideration (step 525). In order to understand the significance of the elimination step, it is useful to recall the fundamental purpose of confusion sets, namely, to group together those characters that have greater than a certain chance of being confused for one another by a speech recognizer for which the confusion sets were generated. Since the character members of confusion sets are organized according to this manner, it necessarily follows that character members from different confusion sets would have only a remote chance of being confused by the speech recognizer. Therefore, by determining whether mismatched character members of corresponding character sequences from misrecognized and reference identifiers are from the same confusion set, CPU 40 can eliminate those reference identifiers having only a slight chance of actually being the reference identifier that matches the input identifier.

Returning to FIG. 5, if CPU 40 eliminates the current reference identifier and determines that more reference identifiers remain (step 530) to be compared with the recognized identifier, CPU 40 goes to the next reference identifier (step 535) and repeats the same analysis just described. If the current character from the reference identifier and the current character from the recognized identifier are from the same confusion set and if more characters remain (step 540), CPU 40 moves on to the next characters (step 545) in the recognized and reference identifiers and repeats the same analysis of steps 520–535. After performing this analysis for each reference identifier (step 550), CPU 40 determines how many of the reference identifiers in database 35 were not eliminated form consideration (step 555). These non-eliminated reference identifiers may be referred to as candidate reference identifiers. If the amount of non-eliminated reference identifiers is greater than one, CPU 40 causes voice prompt device 60 to prompt the user with each of the remaining reference identifiers until either the user positively confirms that a prompted reference identifier corresponds to what he spoke into voice input/output device or until the user is prompted with all the candidate reference identifiers (step 560). If the user does not confirm that any candidate reference identifier matches the input identifier spoken into voice input/output device 15, CPU 40 may request that the user speak the input identifier once more into voice input/output device so that system 10 can find a match for the input identifier on the basis of a new voice signal. If the user provides a positive confirmation for a particular candidate reference identifier, then the confirmed reference identifier is selected as matching the input identifier (step 565).

Repeatedly prompting a user with reference identifiers may become time-consuming and annoy the user if the amount of candidate reference identifiers is too large. In order to automatically narrow the candidate reference identifiers to one reference identifier, the password verification module 75 may be programmed to require CPU 40 to calculate an associative weighting for each candidate reference identifier. U.S. patent application Ser. No. 09/018,575, filed Feb. 5, 1988, entitled "A CONFUSION SET BASED METHOD AND SYSTEM FOR CORRECTING MISRECOGNIZED WORDS APPEARING IN DOCUMENTS GENERATED BY AN OPTICAL CHARACTER RECOGNITION TECHNIQUE", and which is incorporated by reference herein, also contains a discussion of associative weightings. In order to determine associative weightings for identifiers, CPU 40 assigns to each confusion set a value referred to as a character weighting. Character weightings are of two types: character change weightings and character identity weightings. Character change weightings reflect the average probability that a particular character will be recognized as another character of the same confusion set; character identity weightings reflect the average probability that a character will be correctly recognized as itself. For reasons that shall soon become apparent, this second type of weighting is referred to as a "diagonal" weighting as well.

Based on these character weightings, CPU 40 determines an associative weighting value for each candidate. CPU 40 selects a candidate reference identifier that matches the input identifier on the basis of the associative weightings assigned to the candidate reference identifiers. An associative weighting is an expression of the relative likelihood that the particular reference identifier to which the weighting has been assigned matches the input identifier provided by the user.

FIG. 6 illustrates a flow diagram representing instructions maintained in module 75 by which a matching candidate reference identifier is selected on the basis of associative weightings that have been assigned to each candidate reference identifier. As with the procedure outlined in FIG. 5, the procedure in FIG. 6 begins with the prompting of a user to provide an input identifier (step 600). After producing a recognized identifier (step 605) and comparing the first character in the recognized identifier and first reference identifier (steps 610–615), CPU 40 determines whether these current characters are from the same confusion set (step 620). As explained above, CPU 40 eliminates from consideration those reference identifiers that include characters not from the same confusion set as characters in the same corresponding character positions of the recognized identifier (steps 625–650).

If only one reference identifier remains after this process of elimination (step 655), the remaining candidate reference identifier is selected as matching the input identifier (step 705). On the other hand, unlike the procedure in FIG. 5, when more than one candidate reference identifier remains after the process of elimination in steps 620–645, CPU 40 calculates for each candidate reference identifier an associative weighting, on the basis of which a matching reference identifier is selected. In order to generate an associative weighting for a particular reference identifier, either a character change weighting or a character identity (or "diagonal") weighting must be assigned to each character of each candidate reference identifier.

Each confusion set is assigned a different character change weighting. Each confusion set may also be assigned a separate character identity weighting or, instead, an overall character weighting applicable to each confusion set may be used. The character change weighting assigned to each confusion set is an average of each of the confusion matrix values that reflect the respective probabilities that one character of the confusion set would be misrecognized as another character of the confusion set. For example, with respect to confusion set 1, which includes the characters A, J, and K, CPU 40 would obtain from the confusion matrix maintained in memory 45 the probability that an A would be misrecognized by the speech recognizer 30 as J, the probability that an A would be misrecognized as a K, the probability that a K would be recognized as an J, etc., until the probabilities of recognizing any character as any other character within the same confusion set has been obtained from the confusion matrix. Once all these recognition probabilities are obtained from the confusion matrix, CPU 40 averages them and assigns this averaged value to confusion set 1. This value is the character change weighting for confusion set 1. The same process is repeated in order to generate character change weightings for each one of confusion sets 2–7. In the confusion sets of FIG. 4, assume that confusion set 1 is assigned a character change weighting of 0.70, confusion set 2 is assigned a character change weighting of 0.60, confusion set 3 is assigned a character change weighting of 0.40, confusion set 4 is assigned a character change weighting of 0.75, confusion set 5 is assigned a character change weighting of 0.45, confusion set 6 is assigned a character change weighting of 0.96, and confusion set 7 is assigned a character change weighting of 0.92.

A character identity weighting is an average of the confusion matrix probabilities that each particular character to which this weighting corresponds will be correctly recognized as itself. For instance, in confusion set 1, this character identity weighting would be the average of the probability that an A would be recognized as an A, the probability that a J would be recognized as a J, and the probability that a K would be recognized as a K. These probabilities are obtained from a confusion matrix that is associated with the speech recognizer to be used, and the resulting character identity weighting is also referred to as a diagonal probability because the probabilities used to determine this weighting all lie along the diagonal leading from the top left hand corner to the bottom right hand corner of the confusion matrix. This calculation is carried out for each of the confusion sets, so that each confusion set is associated not only with a character change weighting, but also with a character identity weighting. Assume that in this example, confusion set 1 is associated with a character identity weighting of 0.91, confusion set 2 is assigned a character identity weighting of 0.95, confusion set 3 is assigned a character identity weighting of 0.93, confusion set 4 is assigned a character identity weighting of 0.95, confusion set 5 is assigned a character identity weighting of 0.94, confusion set 6 is assigned a character identity weighting of 0.96, and confusion set 7 is assigned a character identity weighting of 0.92. The character identity weightings and associated character change weightings for confusion sets 6 and 7 are the same because each of these confusion sets includes only one character.

As an alternative, an overall, or global, character identity weighting may be calculated and applied to each of the confusion sets. This global character identity is the average of all of the probability values maintained along the above-mentioned diagonal of the confusion matrix, which reflects the probabilities of recognizing each character encompassed by the confusion matrix as itself. Once this global character identity weighting is determined, it is associated with each confusion set. Assume that in this example, the global character identity weighting is 0.96.

Returning to FIG. 6, assume that the input identifier is AEJFD, the recognized identifier is JBKFP, and that the remaining candidate reference identifiers are KBAXV, ATASE, AEJFD, and AEAST. In this example, CPU 40 would go to the first candidate reference identifier, KBAXV, and compare it to the recognized identifier JBKFP (step 660). CPU 40 then compares the first characters in these identifiers, namely J and K, to determine whether they are different or the same characters (steps 665–670) (the determination of whether they belong to the same confusion set was made at step 620). If these characters are different, as they are here, CPU 40 assigns to character K of the candidate reference identifier the character change weighting associated with K's confusion set, which is confusion set 1 (step 675). This character change weighting, as mentioned above, is 0.70. Going to the next characters in the recognized identifier and the reference identifier (step 685), B and B, CPU 40 determines in step 670 that they are the same character; consequently, CPU 40 assigns to character B of the reference identifier the character identity weighting for confusion set 2, which is 0.95 (step 680). If each confusion set was instead associated with a common, global character identity weighting, CPU 40 would assign the weighting of 0.96 to character B. After repeating this process for each character of reference identifier KBAXV, the following character weightings are determined:

K: 0.70
B: 0.96
A: 0.70
X: 0.40
V: 0.60

In order to determine an associative weighting for this reference identifier, these character weightings are multiplied together (step 695). Based on this multiplication, the associative weighting for reference identifier KBAXV is 0.113. This process is repeated for the remaining reference identifiers, so that the following associative weightings are produced:

ATASE: 0.115
AEJFD: 0.164
AEAST: 0.115

After assigning an associative weighting to each candidate reference identifier in the manner described above, CPU 40 selects from this grouping a candidate reference identifier that matches the input identifier (step 705). CPU 40 accomplishes this by selecting the candidate reference identifier associated with the highest associative weighting; in this case, that reference identifier is AEJFD, which corresponds to the input identifier. As an alternative, instead of selecting the candidate reference identifier with the highest associative weighting, CPU 40 may instead select the candidate reference identifiers with the N highest associative weightings, or CPU 40 may select those candidate reference identifiers associated with associative weightings that exceed an empirically determined threshold. The user may then be prompted with each of the candidate reference identifiers selected in this fashion until the user provides a positive confirmation. An efficient way to prompt the user with these candidate reference identifiers would be to first rank them in descending order according to their associative weightings, and then start the prompting procedure with the highest ranked candidate reference identifier.

As is evident from this discussion, the present invention is broadly directed to a reference identifier correction system that uses a plurality of predetermined confusion sets to compensate and correct for any errors that may occur when a speech recognizer produces a recognized identifier in response to an input identifier. Thus, unlike previously proposed identifier recognition systems, which would be incapable of finding a match for an input identifier once an erroneous recognized identifier is produced, the system of the present invention can find a match for an input identifier even if the system initially misrecognizes the input identifier. As a consequence of this invention, much time is saved since users will much less frequently be required to re-enter input identifiers that were erroneously processed by the speech recognizer.

The above described embodiments are illustrative of the principles of the present invention. Other embodiments could be devised by those skilled in the art without departing from the spirit and scope of the present invention.

What is claimed is:

1. A method of recognizing an identifier entered by a user, the identifier including a first plurality of predetermined characters, the method comprising the steps of:
   a) providing a recognized identifier based on the entered identifier, the recognized identifier comprising a second plurality of predetermined characters;
   b) providing a plurality of reference identifiers, each one of the plurality of reference identifiers comprising a different plurality of predetermined characters;
   c) providing a plurality of confusion sets, each confusion set grouping together a different set of character members;
   d) comparing at least one character in the recognized identifier with a character in a corresponding character position of a current reference identifier to determine which characters in the recognized identifier do not correspond to the characters in the corresponding character positions of the current reference identifier;
   e) eliminating the current reference identifier if the character of any character position of the recognized identifier does not match the character in the corresponding character position of the current reference identifier and if the characters in the corresponding character positions of the recognized identifier and the current reference identifier are not from the same confusion set;
   f) repeating steps d) and e) for every reference identifier, the remaining non-eliminated reference identifiers comprising a set of candidate reference identifiers;
   g) reducing, if the set of candidate reference identifiers includes more than one reference identifier, the set of candidate of reference identifiers to a single reference identifier in accordance with a set of predetermined criteria; and
   h) selecting the candidate reference identifier remaining in the set of candidate reference identifiers as corresponding to the input identifier.

2. The method according to claim 1, wherein each one of the entered identifier, the recognized identifier, and the plurality of reference identifiers comprises a plurality of alphanumeric characters.

3. The method according to claim 1, wherein each one of the entered identifier, the recognized identifier, and the plurality of reference identifiers comprises a plurality of numbers.

4. The method according to claim 1, wherein each one of the entered identifier, the recognized identifier, and the plurality of reference identifiers comprises a plurality of alphabetical letters.

5. The method according to claim 1, wherein the plurality of confusion sets is derived from at least one confusion matrix.

6. The method of claim 1, wherein the entered identifier is entered by the user speaking the identifier into a voice input device.

7. The method according to claim 6, wherein the recognized identifier is provided by a speech recognizer.

8. The method of claim 1, wherein the entered identifier is entered by the user through a touch-tone input device.

9. The method of claim 8, wherein the recognized identifier is provided by a touch-tone recognizer.

10. The method according to claim 1, wherein the step g) comprises:
   i) prompting the user with each candidate reference identifier until the user provides a positive confirmation indicating that a prompted candidate reference identifier corresponds to the input identifier; and
   ii) ceasing the prompting in step i) if the user has been prompted with each candidate reference identifier.

11. The method according to claim 1, wherein the step g) comprises:
   i) assigning an associative weighting to each one of the set of candidate reference identifiers; and
   ii) selecting the candidate reference identifier with the highest associating weighting.

12. The method according to claim 11, wherein the step i) comprises:
   iii) assigning a character change weighting and a character identity weighting to each one of the plurality of confusion sets
   iv) going to a first one of the set of candidate reference identifiers;
   v) determining for each character position of the candidate reference identifier the confusion set to which the character occupying the character position belongs;
   vi) determining for each character position of the candidate reference identifier whether the character included therein is the same as the character of the corresponding character position of the misrecognized identifier;
   vii) assigning to each character position of the candidate reference identifier one of the character change weighting and the character identity weighting of the confusion set associated with the character occupying each character position of the candidate reference identifier;
   viii) determining an associative weighting for the candidate reference identifier on the basis of the character weightings assigned to each character position in step vii); and
   ix) repeating steps v)–viii) for each candidate reference identifier.

13. The method according to claim 12, wherein the step viii) comprises multiplying together each of the one of the character change weightings and character identity weightings assigned to each character position of the candidate reference identifier.

14. An apparatus for recognizing an identifier entered by a user, the identifier including a first plurality of predetermined characters, the apparatus comprising:
   a) first means for providing a recognized identifier based on the entered identifier, the recognized identifier comprising a second plurality of predetermined characters;
   b) second means for providing a plurality of reference identifiers, each one of the plurality of reference identifiers comprising a different plurality of predetermined characters;
   c) third means for providing a plurality of confusion sets, each confusion set grouping together a different set of character members;
   d) means for comparing at least one character in the recognized identifier with a character in a corresponding character position of a current reference identifier to determine which characters in the recognized identifier correspond to the character in the corresponding character positions of the current reference identifier;
   e) means for eliminating the current reference identifier if the character of any character position of the recognized identifier does not match the character in the corresponding character position of the current reference identifier and if the characters in the corresponding character positions of the recognized identifier and the current reference identifier are not from the same confusion set;
   f) means for repeating the operation of the means for comparing and the means for eliminating for every reference identifier, the remaining non-eliminated reference identifiers comprising a set of candidate reference identifiers;
   g) means for reducing, if the set of candidate reference identifiers includes more than one reference identifier, the set of candidate reference identifiers to a single reference identifier in accordance with a set of predetermined criteria; and
   h) first means for selecting the candidate reference identifier remaining in the set of candidate reference identifiers as corresponding to the input identifier.

15. The apparatus according to claim 14, wherein each one of the entered identifier, the recognized identifier, and the plurality of reference identifiers comprises a plurality of alphanumeric characters.

16. The apparatus according to claim 14, wherein each one of the entered identifier, the recognized identifier, and the plurality of reference identifiers comprises a plurality of numbers.

17. The apparatus according to claim 14, wherein each one of the entered identifier, the recognized identifier, and the plurality of reference identifiers comprises a plurality of alphabetical letters.

18. The apparatus according to claim 14, wherein the plurality of confusion sets is derived from at least one confusion matrix.

19. The apparatus of claim 14, wherein the entered identifier is entered by the user speaking the identifier into a voice input device.

20. The apparatus according to claim 19, wherein the recognized identifier is provided by a speech recognizer.

21. The apparatus of claim 14, wherein the entered identifier is entered by the user through a touch-tone input device.

22. The apparatus of claim 21, wherein the recognized identifier is provided by a touch-tone recognizer.

23. The apparatus according to claim 14, wherein the step means for reducing comprises:
   i) means for prompting the user with each candidate reference identifier until the user provides a positive confirmation indicating that a prompted candidate reference identifier corresponds to the input identifier; and
   ii) means for ceasing the prompting means if the user has been prompted with each candidate reference identifier.

24. The apparatus according to claim 14, wherein the means for reducing comprises:
   i) first means for assigning an associative weighting to each one of the set of candidate reference identifiers; and
   ii) second means for selecting the candidate reference identifier with the highest associative weighting.

25. The apparatus according to claim 24, wherein the first means for assigning comprises:
- iii) second means for assigning a character change weighting and a character identity weighting to each one of the plurality of confusion sets
- iv) means for going to each one of the set of candidate reference identifiers;
- v) first means for determining for each character position of the candidate reference identifier the confusion set to which the character occupying the character position belongs;
- vi) second means for determining for each character position of the candidate reference identifier whether the character included therein is the same as the character of the corresponding character position of the misrecognized identifier;
- vii) third means for assigning to each character position of the candidate reference identifier one of the character change weighting and the character identity weighting of the confusion set associated with the character occupying each character position of the candidate reference identifier; and
- viii) third means for determining an associative weighting for the candidate reference identifier on the basis of the character weightings assigned to each character position by the third means for assigning.

26. The apparatus according to claim 25, wherein the third means for determining comprises means for multiplying together each of the one of the character change weightings and character identity weightings assigned to each character position of the candidate reference identifier.

27. An apparatus for recognizing at least one input identifier provided by a user, the apparatus comprising:
- a speech recognizer;
- a processing device in communication with the speech recognizer;
- an identifier verification module in communication with the processing device, the identifier verification module eliminating each previously retrieved reference identifier that includes a character that does not match a character of a corresponding character position in a recognized identifier and that is of a different confusion set than that of the character of the corresponding character position in the recognized identifier;
- a confusion matrix memory in communication with the processing device;
- a confusion set generating module in communication with the processing device;
- a confusion set memory in communication with the processing device; and
- a reference identifier database in communication with the processing device.

28. The apparatus according to claim 27, further comprising:
- a data input device in communication with the processing device; and
- a display device in communication with the processing device.

\* \* \* \* \*